(12) United States Patent
Ke et al.

(10) Patent No.: US 12,485,780 B2
(45) Date of Patent: Dec. 2, 2025

(54) ELECTRO MECHANICAL OR ELECTRICAL CONNECTOR FOR USE IN ELECTRIC VEHICLE

(71) Applicant: Advanced Connectek Inc., New Taipei (TW)

(72) Inventors: Yu Feng Ke, New Taipei (TW); Sheng-Hsiang Huang, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 913 days.

(21) Appl. No.: 17/709,463

(22) Filed: Mar. 31, 2022

(65) Prior Publication Data

US 2022/0324342 A1     Oct. 13, 2022

(30) Foreign Application Priority Data

Apr. 12, 2021    (TW) ................................. 110203920

(51) Int. Cl.
     *B60L 53/16*          (2019.01)
     *H01R 13/627*        (2006.01)
     *H01R 43/26*         (2006.01)

(52) U.S. Cl.
     CPC .......... *B60L 53/16* (2019.02); *H01R 13/6272* (2013.01); *H01R 43/26* (2013.01); *H01R 2201/26* (2013.01)

(58) Field of Classification Search
     CPC ...... B60L 53/16; H01R 43/26; H01R 2201/26
     USPC .......................................................... 320/104
     See application file for complete search history.

(56) References Cited

U.S. PATENT DOCUMENTS

| | | | |
|---|---|---|---|
| 7,878,866 B1* | 2/2011 | Kwasny | H01R 13/633 439/923 |
| 8,834,202 B2* | 9/2014 | Kwasny | H01R 43/20 439/604 |
| 9,793,642 B2* | 10/2017 | Natter | B60L 53/31 |
| 10,601,174 B2* | 3/2020 | Li | H01R 13/633 |
| 2015/0147919 A1* | 5/2015 | Seelig | B60L 53/16 439/695 |
| 2018/0083381 A1* | 3/2018 | Mueller | H01R 13/5205 |

FOREIGN PATENT DOCUMENTS

CN          2603557      2/2004
CN          102856857      1/2013

* cited by examiner

*Primary Examiner* — Suchin Parihar
(74) *Attorney, Agent, or Firm* — JCIPRNET (57) ABSTRACT

An electro mechanical or electrical connector for use in an electric vehicle including a plug body, a sealing ring, a locking member, and a cable is provided. The plug body has an inner wall and at least one locking recess on the inner wall. The sealing ring and the locking member are respectively disposed on the inner wall. The locking member has at least one elastic locking hook. The cable passes through the plug body, the sealing ring, and the locking member. The locking member is locked in the locking recess by the elastic locking hook to be attached to the inner wall, and forces the sealing ring to seal a space between the inner wall and the cable.

22 Claims, 8 Drawing Sheets

ELECTRO MECHANICAL OR ELECTRICAL CONNECTOR FOR USE IN ELECTRIC VEHICLE

CROSS-REFERENCE TO RELATED APPLICATION

This application claims the priority benefit of Taiwan application serial no. 110203920, filed on Apr. 12, 2021. The entirety of the above-mentioned patent application is hereby incorporated by reference herein and made a part of this specification.

BACKGROUND

Technical Field

The disclosure relates to an electro mechanical or electrical connector, and more particularly, to an electro mechanical or electrical connector for use in an electric vehicle.

Description of Related Art

Current electric vehicles can be charged by connecting them to the mains power supply (mains plug) in the user's home through an adapter, or charged through commercial charging stations set up by electric vehicle manufacturers. The electric power company sends electricity to the AC equipment at the commercial charging stations, and then the electric vehicles are charged through the chargers of the charging stations.

When charging, the user must use the charging adapter carefully. The charging adapter is usually used outdoors. Once the moisture or dust enters the charging adapter, the user may suffer an electric shock when connecting the charging adapter to the matched electrical connector or adapter to transmit the power, or disconnecting the charging adapter to the matched electrical connector or adapter to interrupt the power transmission.

In order to prevent the moisture or dust from entering the charging adapter when it is not in use, the current charging adapter is generally equipped with a cover or a cover plate to selectively cover or expose the electrical contacts, thereby achieving a considerable degree of waterproof and dustproof. However, such conventional technology has many shortcomings and inconveniences. For example, when the charging adapter is not in use, the user does not necessarily have the habit of putting the cover or the cover plate back on the opening of the charging adapter. In this case, the electrical contacts of the charging adapter are exposed to the surrounding environment, which is likely to cause the electrical contacts to corrode.

Furthermore, the user may accidentally touch the electrical contacts of the charging adapter and then suffer the electric shock. In addition, when the user forgets to put the cover or the cover plate back on the opening of the charging adapter, and the moisture or dust has also entered the charging adapter, the user may suffer the electric shock when connecting the charging adapter to the matched electrical connector or adapter to transmit the power, or disconnecting the charging adapter to the matched electrical connector or adapter to interrupt the power transmission.

In addition, the current electro mechanical or electrical connectors also try to achieve the above objectives by means of screw locking and waterproofing a sealing ring. However, there are still issues such as the excessive components and the complex structure.

In view of this, how to enable the electro mechanical or electrical connector to achieve the required waterproof and dustproof effects with a simple structure has become an issue for people of ordinary skills in the art to work on.

SUMMARY

The disclosure provides an electro mechanical or electrical connector for use in an electric vehicle, which achieves multiple waterproof and dustproof effects by a mutual cooperation of a protection assembly and a plug body.

The disclosure provides an electro mechanical or electrical connector for use in an electric vehicle including a plug body, a sealing ring, a locking member, and a cable. The plug body has an inner wall and at least one locking recess on the inner wall. The sealing ring and the locking member are respectively disposed on the inner wall. The locking member has at least one elastic locking hook. The cable is sheathed with the plug body, the sealing ring, and the locking member. The locking member is locked in the locking recess by the elastic locking hook to be attached to the inner wall, and forces the sealing ring to seal a space between the inner wall and the cable.

The disclosure provides an electro mechanical or electrical connector for use in an electric vehicle including a plug body, a cable, a first protection assembly, and a second protection assembly. The plug body has an inner wall, a tail end, and at least one locking recess on the inner wall. The cable passes through the plug body from the tail end. The first protection assembly is sleeved on the cable and locked in the locking recess to seal a space between the inner wall and the cable. The second protection assembly is sleeved on the cable, assembled at the tail end of the plug body, and partially passes through the plug body to abut the first protection assembly.

Based on the above, through the mutual cooperation of the first protection assembly formed by the sealing ring and the locking member of the electro mechanical or electrical connector for use in the electric vehicle, and the plug body, the sealing ring may be forced on the inner wall of the plug body while the locking member is locked with the locking recess on the inner wall of the plug body, such that the sealing ring may seal the space between the cable and the inner wall to achieve a first layer of protection (the waterproof and dustproof) effect. Furthermore, the electro mechanical or electrical connector for use in the electric vehicle further includes the second protection assembly assembled at the tail end of the plug body. The second protection assembly partially extends into the plug body during the assembling process, and tightly abuts the first protection assembly that has been attached to the inner wall, thereby forming a second layer of protection (the waterproof and dustproof) effect.

DETAILED DESCRIPTION OF DISCLOSED EMBODIMENTS

Figure 1:
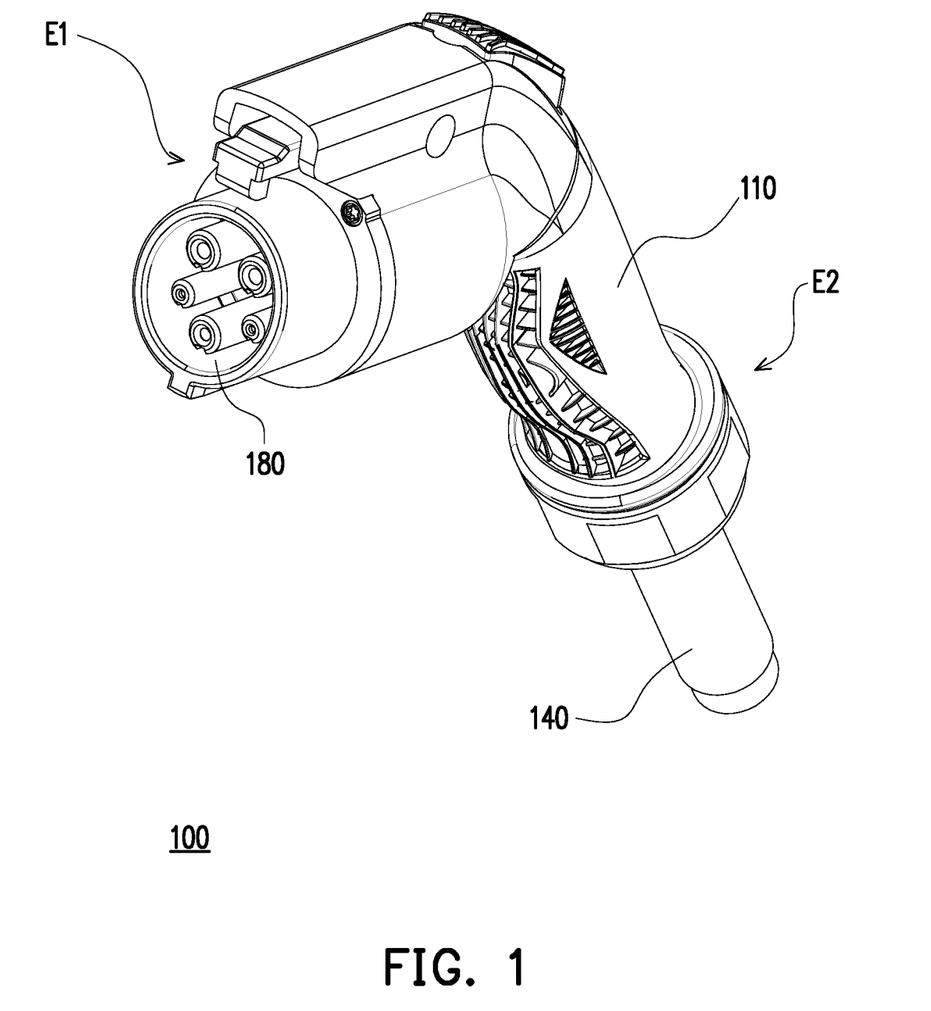
FIG. 1 is a schematic view of an electro mechanical or electrical connector for use in an electric vehicle according to an embodiment of the disclosure.
Figure 2:
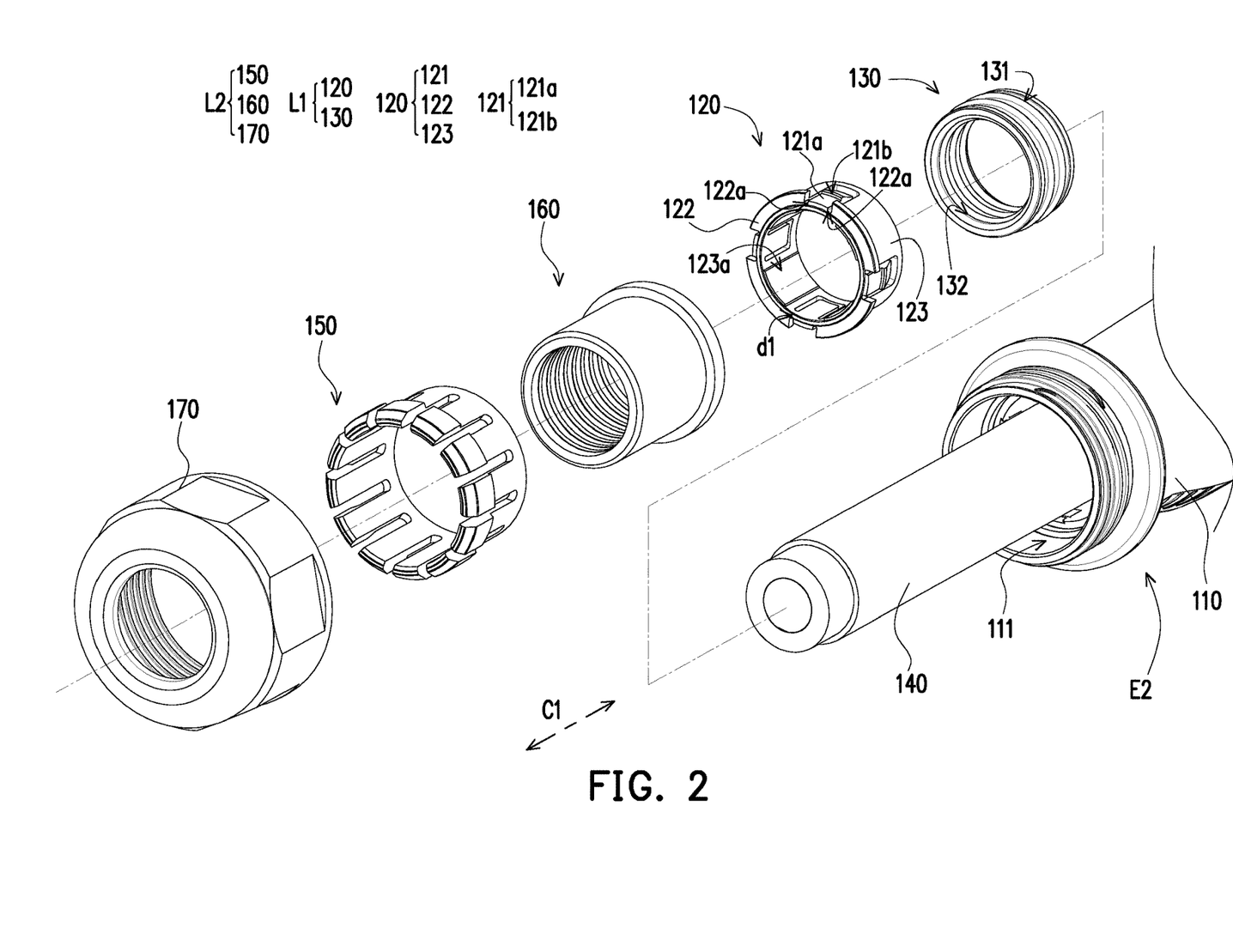
FIG. 2 is an exploded view of the electro mechanical or electrical connector for use in the electric vehicle of FIG. 1.
Figure 3:
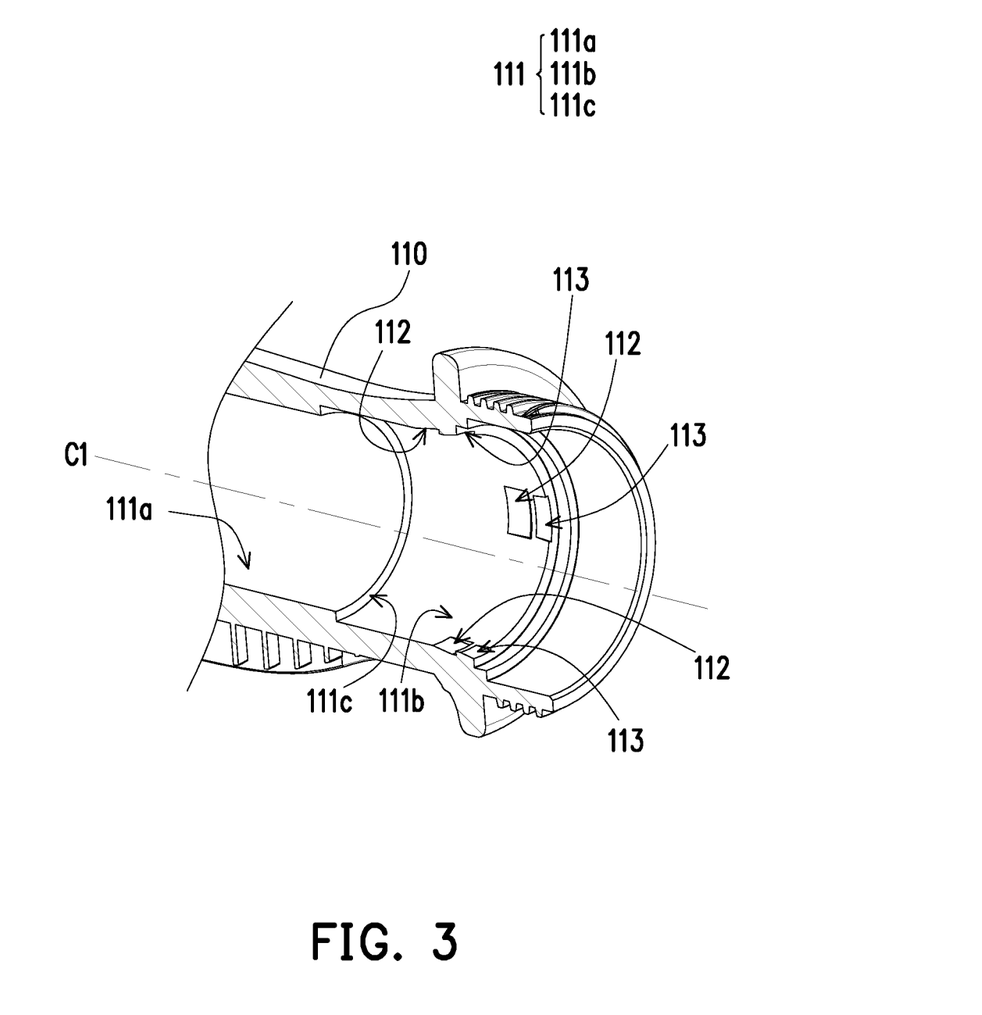
FIG. 3 is a schematic partial view of a plug body of FIG. 2.

FIG. 1 is a schematic view of an electro mechanical or electrical connector for use in an electric vehicle according to an embodiment of the disclosure. FIG. 2 is an exploded view of the electro mechanical or electrical connector for use in the electric vehicle of FIG. 1. Here, only components related to this embodiment are illustrated. FIG. 3 is a schematic partial view of a plug body of FIG. 2. Referring to FIGS. 1 to 3 together, in this embodiment, an electro mechanical or electrical connector 100 for use in an electric vehicle includes a plug body 110, a cable 140, a first protection assembly L1, a second protection assembly L2, and multiple metal contacts 180. The plug body 110 has an inner wall 111, a head end E1 and a tail end E2 opposite to each other, and a locking recess 112 on the inner wall 111. The cable 140 passes through the plug body 110 from the tail end E2, and is electrically connected to the metal contacts 180 disposed in the head end E1. As shown in FIG. 1, this embodiment illustrates a part of a handle structure of the electro mechanical or electrical connector 100 for use in the electric vehicle. An unillustrated end of the cable 140 away from the plug body 110 is substantially connected to a charging power source. A user holds the handle structure to enable the metal contacts 180 to be connected to an electric car (or an electric vehicle) for charging.

Figure 4:
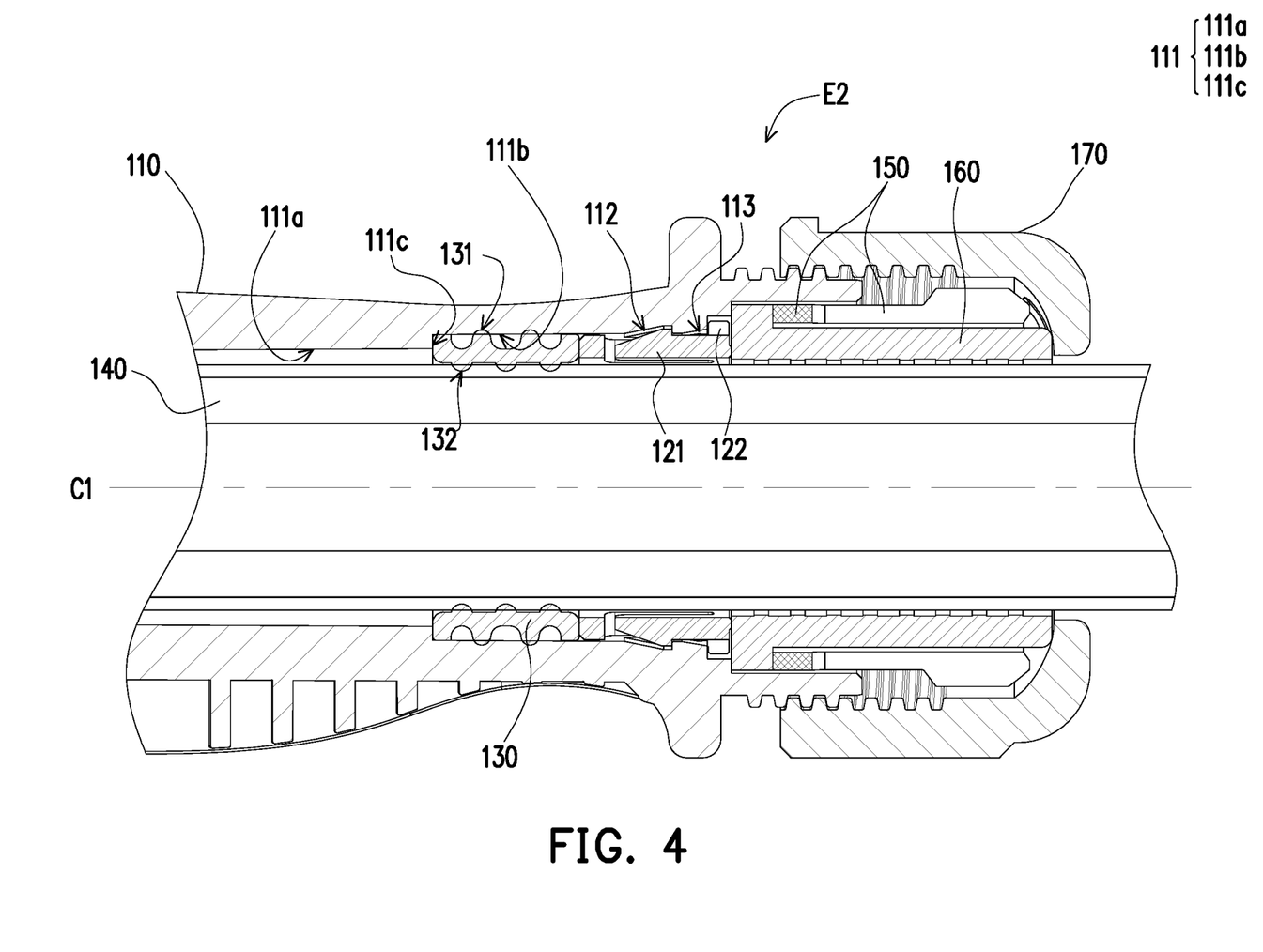
FIG. 4 is a partial cross-sectional view of the electro mechanical or electrical connector for use in the electric vehicle of FIG. 1.

FIG. 4 is a partial cross-sectional view of the electro mechanical or electrical connector for use in the electric vehicle of FIG. 1. Referring to FIGS. 2 to 4 together, in this embodiment, the first protection assembly L1 is sleeved on the cable 140 and locked in the locking recess 112 to seal a space between the inner wall 111 and the cable 140. The second protection assembly L2 is sleeved on the cable 140 and assembled at the tail end E2 of the plug body 110, and a part of the second protection assembly L2 passes through the plug body 110 to abut the first protection assembly L1.

In detail, as shown in FIG. 2, the first protection assembly L1 includes a sealing ring 130 and a locking member 120. The sealing ring 130 is elastic, and is, for example, formed by rubber. The sealing ring 130 is disposed on the inner wall 111 and sleeved on the cable 140.

The locking member 120 is sleeved on the cable 140 and located at the tail end E2. The locking member 120 has an elastic locking hook 121. The locking member 120 is locked in the locking recess 112 by the elastic locking hook 121 to be attached to the inner wall 111, and forces (deforms by pressing to achieve a sealing effect) the sealing ring 130. As shown in FIG. 3, the inner wall 111 has a stepped structure, so that the locking member 120 locked on the inner wall 111 may apply force to the sealing ring 130 to enable the sealing ring 130 to tightly abut the stepped structure. A direction in which the locking member 120 applies force to the sealing ring 130 is parallel to an extending axial direction C1 of the cable 140.

Furthermore, the above stepped structure includes two annular walls 111a and 111b with different inner diameters, and a step wall 111c adjacent to the two annular walls 111a and 111b. The locking member 120, the sealing ring 130, and the locking recess 112 are located on the annular wall 111b with a greater inner diameter, and the locking member 120 that has been locked may be pushed an annular body of the sealing ring 130 to tightly abut the step wall 111c. Here, the locking member 120 further includes a bottom ring 122 and a side ring 123. The side ring 123 extends from the bottom ring 122 and tightly abuts the sealing ring 130. The elastic locking hook 121 is located at a gap of the bottom ring 122, and an elastic arm 121a of the elastic locking hook 121 extends from the bottom ring 122 to the side ring 123, and is suspended on the side ring 123. A locking hook portion 121b of the elastic locking hook 121 is located at a free end of the elastic arm 121a, and is substantially away from the bottom ring 122.

As shown in FIG. 4, the sealing ring 130 further has multiple annular protrusions 131 and 132 on inner and outer surfaces. The sealing ring 130 is forced by the locking member 120 to deform, so that the annular protrusions 131 on the outer surface tightly abut the annular wall 111b, and the annular protrusions 132 on the inner surface tightly abut the cable 140. The annular protrusions 131 on the outer surface are intervally distributed in the extending axial direction C1 of the cable 140, and the annular protrusions 132 on the inner surface are intervally distributed in the extending axial direction C1 of the cable 140. Here, the sealing ring 130 and the inner wall 111 are illustrated in a state of interference with each other. That is, the interferences refer to the amount of deformation that the sealing ring 130 generates when forced by the locking member 120.

Referring to FIGS. 3 and 4 again, the second protection assembly L2 of this embodiment includes a bundle tube 160, an annular bundle claw 150, and a back cover 170. The bundle tube 160 is sleeved outside the cable 140 to abut the locking member 120 of the first protection assembly L1, and the bundle tube 160 is elastic. The annular bundle claw 150 is extendably and retractably sleeved outside the bundle tube 160 in a radial direction. The back cover 170 is locked at the tail end E2 of the plug body 110, and the annular bundle claw 150 may be driven to contract during the locking process, so that the annular bundle claw 150 clamps the cable 140 through the bundle tube 160. In this way, as shown in FIG. 4, in the extending axial direction C1 of the cable 140, the first protection assembly L1 and the second protection assembly L2 may form dual waterproof and dustproof measures for the electro mechanical or electrical connector 100 for use in the electric vehicle, such that the electro mechanical or electrical connector 100 for use in the electric vehicle in this embodiment may comply with International Protection Marking IP67 specifications.

Figure 5:
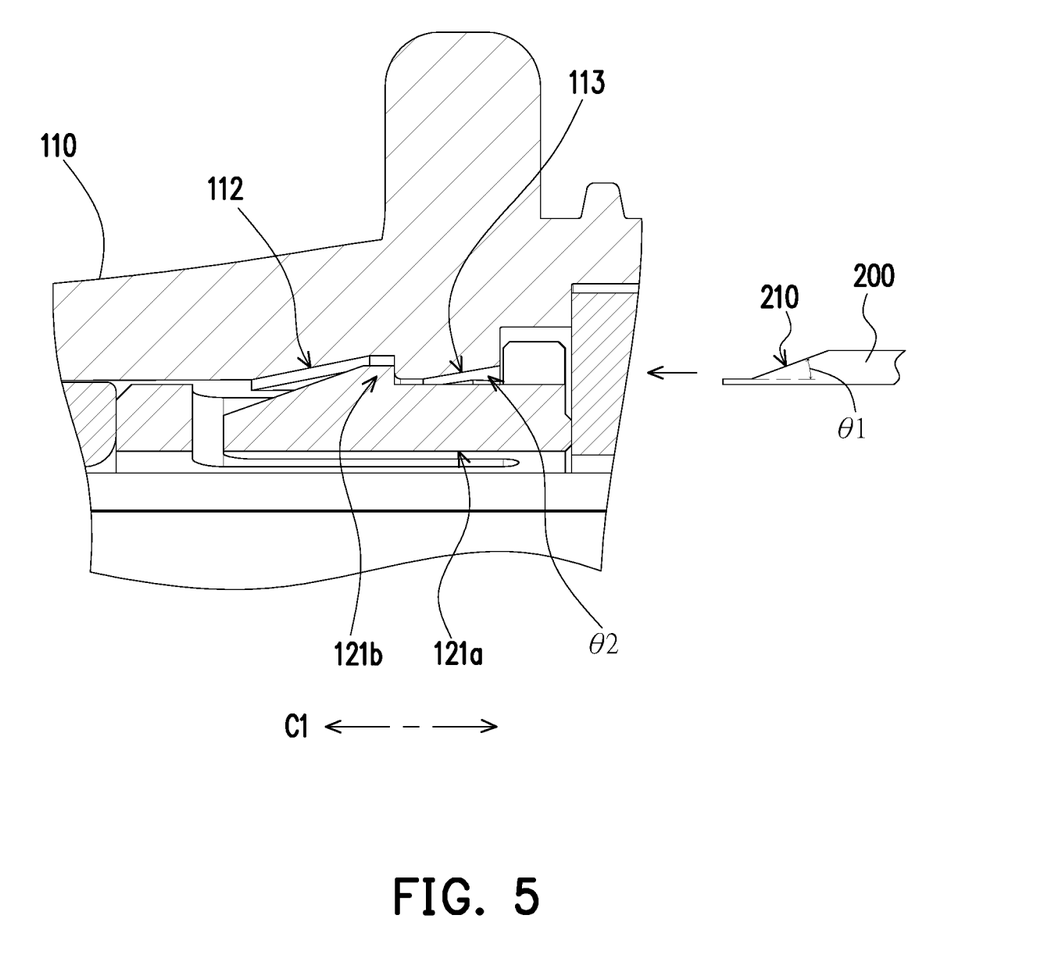
FIG. 5 is a partial enlarged view of FIG. 4.
Figure 6:
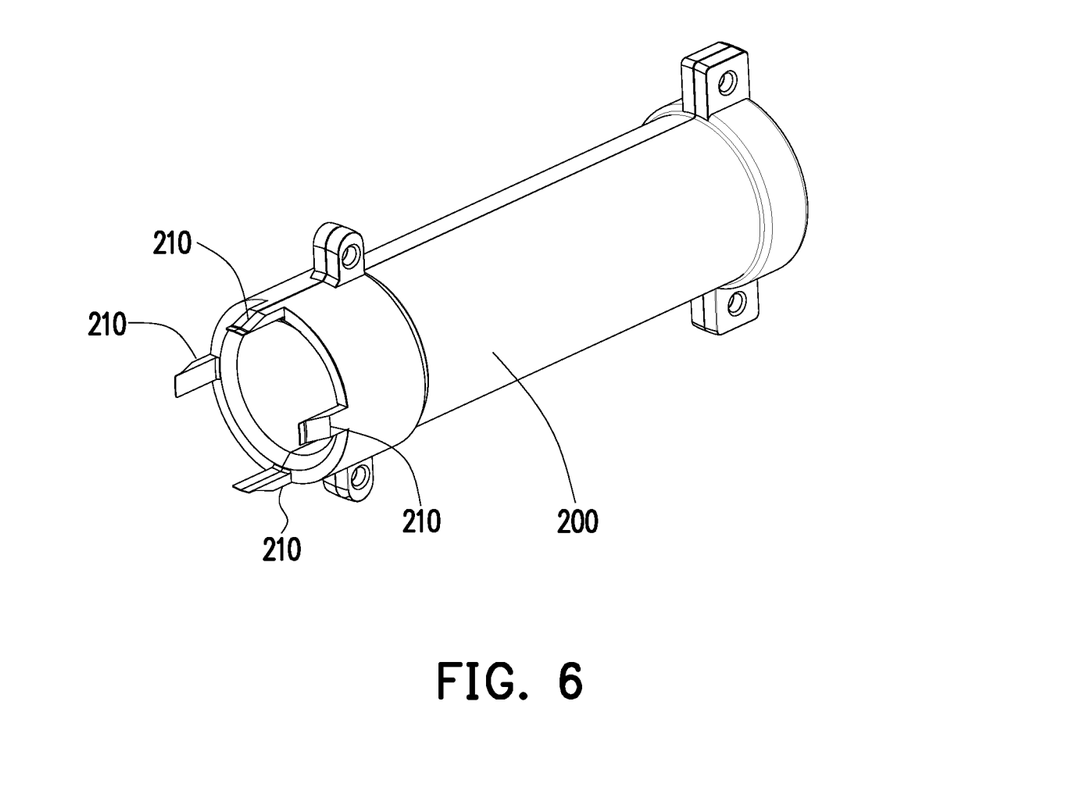
FIG. 6 is a schematic view of an accompanying tool of the electro mechanical or electrical connector for use in the electric vehicle of FIG. 1.

FIG. 5 is a partial enlarged view of FIG. 4. FIG. 6 is a schematic view of an accompanying tool of the electro mechanical or electrical connector for use in the electric vehicle of FIG. 1. Referring to FIGS. 3, 5, and 6 together, the following description allows the user to easily release the first protection assembly L1 of this embodiment. Most of the structure of the second protection assembly L2 is outside the plug body 110, and as shown in FIG. 2, the back cover 170 may be locked at the tail end E2 of the plug body 110. Therefore, after the user removes the back cover 170 from the plug body 110, it is equivalent to releasing the tightening effect of the annular bundle claw 150 and the bundle tube 160 on the cable 140.

In contrast, the first protection assembly L1 is located in the plug body 110. Therefore, after the second protection assembly L2 has been removed from the plug body 110, an additional fixture is bound to be used as an aid, in order to smoothly remove the first protection assembly L1 from the plug body 110. As shown in FIGS. 3 and 5, the plug body 110 of this embodiment further has a releasing recess 113 on the inner wall 111. There is a gap between the elastic arm 121*a* of the locking member 120 and the releasing recess 113. The gap has a wedge-shaped angle θ2, and the gap is tapered toward the locking recess 112. When the second protection assembly L2 is removed, the gap is exposed between the plug body 110 and the cable 140. Accordingly, this embodiment further provides an accompanying tool 200 of the electro mechanical or electrical connector 100 for use in the electric vehicle, which is used to extend into the gap to press and deform the elastic arm 121*a*, so that the locking hook portion 121*b* is disengaged from the locking recess 112. As shown in FIGS. 5 and 6, the accompanying tool 200 is cylindrical, and has four extending pushing portions 210. In particular, the pushing portion 210 has a wedge-shaped contour with a wedge-shaped angle θ1. Since the wedge-shaped angle θ1 is greater than the wedge-shaped angle θ2, when the pushing portion 210 extends into the gap, one side of the pushing portion 210 abuts the releasing recess 113, and the other side abuts the elastic arm 121*a* and presses the elastic arm 121*a*, so that the elastic arm 121*a* is deformed to disengage the locking hook portion 121*b* from the locking recess 112. Accordingly, the effect of releasing the locking member 120 from the inner wall 111 is achieved.

In this embodiment, the locking recess 112 on the inner wall 111, the elastic locking hook 121 of the locking member 120, and the pushing portion 210 of the accompanying tool 200 are each symmetrically disposed relative to the extending axial direction C1 of the cable 140. Therefore, in the process of removing the first protection assembly L1, the user only needs to hold the accompanying tool 200, and put it into the plug body 110 from the tail end E2. When a rotation angle is less than 90 degrees, the pushing portion 210 may be smoothly inserted into the gap, and the locking member 120 is released from the inner wall 111 accordingly.

Figure 7:
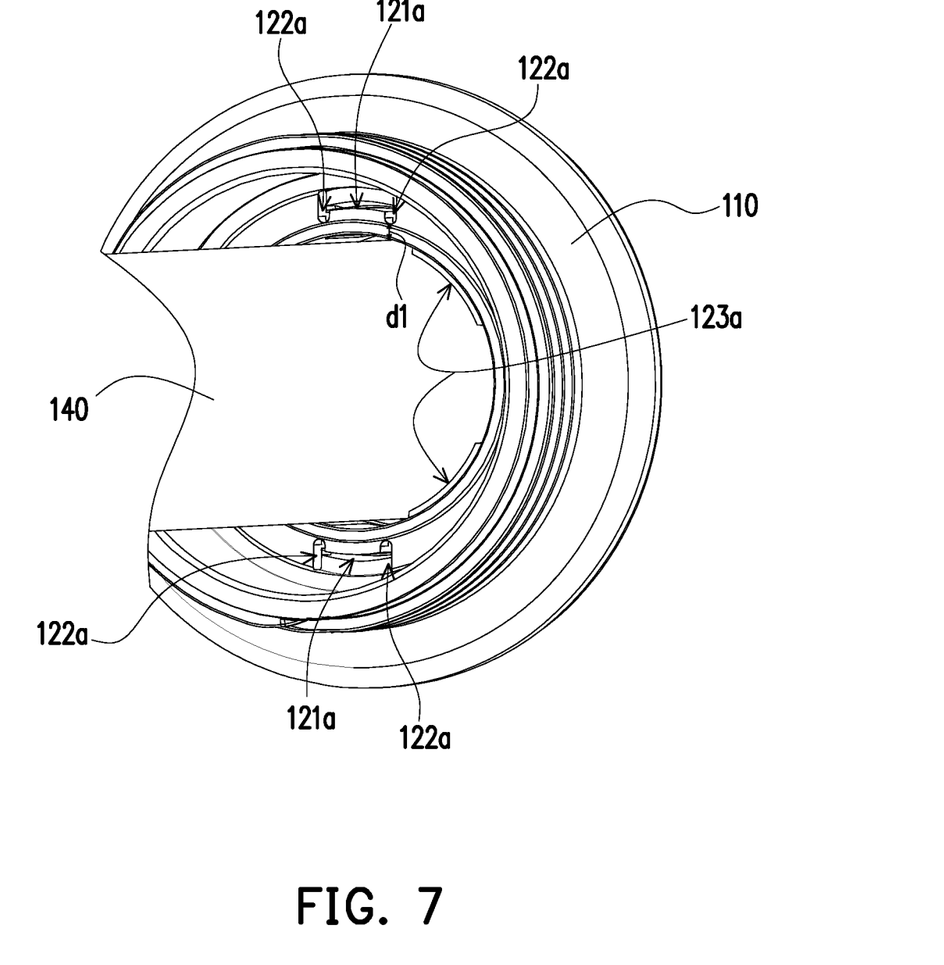
FIG. 7 is a schematic view of partial components of the electro mechanical or electrical connector for use in the electric vehicle of FIG. 1.

FIG. 7 is a schematic view of partial components of the electro mechanical or electrical connector for use in the electric vehicle of FIG. 1. In this embodiment, even without the accompanying tool 200, the user still has a final solution to remove the first protection assembly L1. Referring to both FIGS. 2 and 7, the bottom ring 122 of the locking member 120 has a pair of necking recesses 122*a*, which are adjacent to two opposite sides of the elastic arm 121*a* and have a thickness dl. Therefore, as shown in FIG. 7, the user only needs to destructively shear the necking recess 122*a* having the thickness dl by a cutting tool (such as a diagonal plier), which is equivalent to releasing the elastic force of the elastic arm 121*a* and naturally releasing the locking hook portion 121*b* from the locking recess 112 to achieve the required removal effect.

Figure 8:
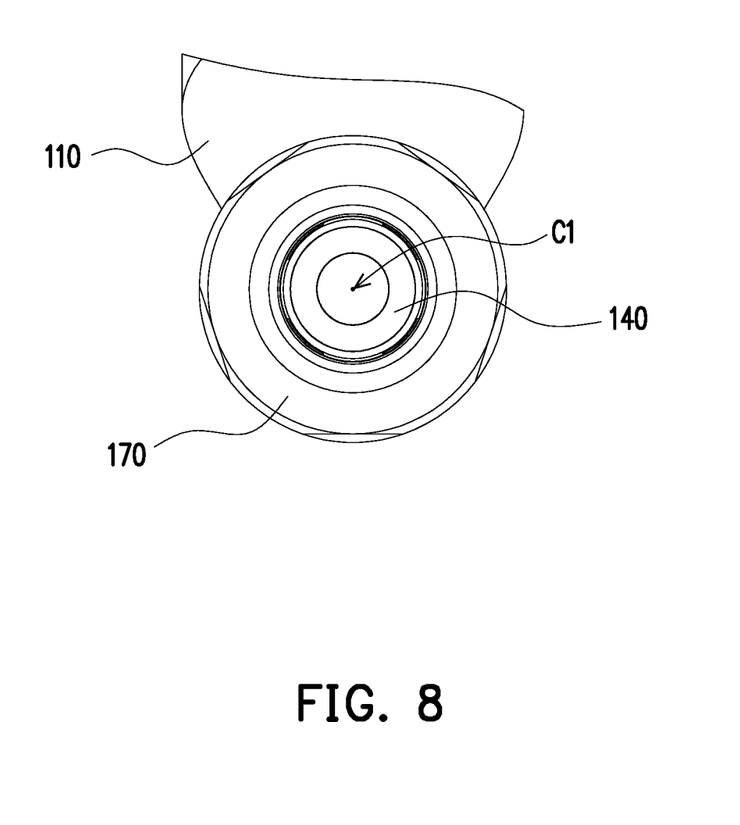
FIG. 8 is a schematic partial view of the electro mechanical or electrical connector for use in the electric vehicle of FIG. 1 from another perspective.

FIG. 8 is a schematic partial view of the electro mechanical or electrical connector for use in the electric vehicle of FIG. 1 from another perspective. Referring to FIG. 8, in this embodiment, in order for the electro mechanical or electrical connector 100 for use in the electric vehicle to have relevant conditions that are not easily damaged, the difficulty of removing the first protection assembly L1 and the second protection assembly L2 is increased. Since the first protection assembly L1 is located in the plug body 110, it is naturally not easy to be removed. As for the second protection assembly L2, the back cover 170 of this embodiment is substantially an asymmetric nut structure relative to the extending axial direction C1 of the cable 140, that is, a pentagonal contour as shown in FIG. 8. In this way, it is not easy for the user to use a common tool to remove the second protection assembly L2.

Based on the above, in the above embodiments of the disclosure, through the mutual cooperation of the first protection assembly formed by the sealing ring and the locking member of the electro mechanical or electrical connector for use in the electric vehicle, and the plug body, the sealing ring may be forced on the inner wall of the plug body while the locking member is locked with the locking recess on the inner wall of the plug body, such that the sealing ring may seal the space between the cable and the inner wall to achieve a first layer of protection (the waterproof and dustproof) effect. Furthermore, the electro mechanical or electrical connector for use in the electric vehicle further includes the second protection assembly assembled at the tail end of the plug body, and the second protection assembly partially extends into the plug body during the assembling process to tightly abut the first protection assembly that has been attached to the inner wall, thereby forming a second layer of protection (the waterproof and dustproof) effect. Therefore, the electro mechanical or electrical connector for use in the electric vehicle may comply with International Protection Marking IP67 specifications accordingly.

What is claimed is:

1. An electro mechanical or electrical connector for use in an electric vehicle, the electro mechanical connector comprising:
   a plug body having an inner wall and at least one locking recess on the inner wall;
   a sealing ring disposed on the inner wall;
   a locking member disposed on the inner wall, wherein the locking member has at least one elastic locking hook; and
   a cable passing through the plug body, the sealing ring, and the locking member, wherein the locking member is locked in the locking recess by the elastic locking hook to be attached to the inner wall, and forces the sealing ring to seal a space between the inner wall and the cable.

2. The electro mechanical or electrical connector for use in the electric vehicle according to claim 1, wherein the sealing ring and the locking member are located at a tail end of the plug body, and the electro mechanical connector for use in the electric vehicle further comprises a plurality of metal contacts disposed at a head end of the plug body and electrically connected to the cable.

3. The electro mechanical or electrical connector for use in the electric vehicle according to claim 1, wherein the inner wall has a stepped structure, the locking member that is locked on the inner wall applies force to the sealing ring, so that the sealing ring tightly abuts the stepped structure, and a direction of a force application is parallel to an extending axial direction of the cable.

4. The electro mechanical or electrical connector for use in the electric vehicle according to claim 3, wherein the stepped structure comprises two annular walls with different inner diameters, and a step wall adjacent to the two annular walls, the locking member and the sealing ring are located on an annular wall with a greater inner diameter, and the locking member pushes an annular body of the sealing ring to tightly abut the step wall.

5. The electro mechanical or electrical connector for use in the electric vehicle according to claim 4, wherein the sealing ring further has a plurality of annular protrusions on inner and outer surfaces, and the sealing ring is forced by the locking member to deform, so that the plurality of annular protrusions on the outer surface tightly abut the annular wall, and the plurality of annular protrusions on the inner surface tightly abut the cable.

6. The electro mechanical or electrical connector for use in the electric vehicle according to claim 5, wherein the plurality of annular protrusions on the outer surface are intervally distributed in the extending axial direction of the cable, and the plurality of annular protrusions on the inner surface are intervally distributed in the extending axial direction of the cable.

7. The electro mechanical or electrical connector for use in the electric vehicle according to claim 1, wherein the locking member further comprises:
   a bottom ring; and
   a side ring extending from the bottom ring and tightly abutting the sealing ring, wherein an elastic arm of the elastic locking hook extends from the bottom ring to the side ring, and is suspended on the side ring, and a locking hook portion of the elastic locking hook is located at a free end of the elastic arm.

8. The electro mechanical or electrical connector for use in the electric vehicle according to claim 7, wherein the bottom ring has a pair of necking recesses adjacent to two opposite sides of the elastic arm.

9. The electro mechanical or electrical connector for use in the electric vehicle according to claim 7, wherein the plug body further has at least one releasing recess on the inner wall, a gap exists between the elastic arm and the releasing recess, the gap is tapered toward the locking recess, and a fixture is adapted for extending into the gap to press and deform the elastic arm, so that the locking hook portion is disengaged from the locking recess.

10. The electro mechanical or electrical connector for use in the electric vehicle according to claim 1, wherein the locking member has a plurality of elastic locking hooks symmetrical relative to an extending axial direction of the cable.

11. An electro mechanical or electrical connector for use in an electric vehicle, comprising:
   a plug body having an inner wall, a tail end, and at least one locking recess on the inner wall;
   a cable passing through the plug body from the tail end;
   a first protection assembly sleeved on the cable and locked in the locking recess to seal a space between the inner wall and the cable; and
   a second protection assembly sleeved on the cable, assembled at the tail end of the plug body, and partially passing through the plug body to abut the first protection assembly, wherein the second protection assembly comprises:
   a bundle tube sleeved outside the cable and abutting the first protection assembly, wherein the bundle tube is elastic;
   an annular bundle claw extendably and retractably sleeved outside the bundle tube in a radial direction; and
   a back cover locked at the tail end and driving the annular bundle claw to contract, to enable the annular bundle claw to clamp the cable through the bundle tube.

12. The electro mechanical or electrical connector for use in the electric vehicle according to claim 11, wherein the first protection assembly comprises:
   a sealing ring disposed on the inner wall and sleeved on the cable; and
   a locking member sleeved on the cable and located at the tail end, wherein the locking member has at least one elastic locking hook, and the locking member is locked in the locking recess by the elastic locking hook to be attached to the inner wall, and forces the sealing ring.

13. The electro mechanical or electrical connector for use in the electric vehicle according to claim 12, further comprising a plurality of metal contacts disposed in a head end of the plug body and electrically connected to the cable.

14. The electro mechanical or electrical connector for use in the electric vehicle according to claim 12, wherein the inner wall has a stepped structure, the locking member that is locked on the inner wall applies force to the sealing ring, so that the sealing ring tightly abuts the stepped structure, and a direction of a force application is parallel to an extending axial direction of the cable.

15. The electro mechanical or electrical connector for use in the electric vehicle according to claim 14, wherein the stepped structure comprises two annular walls with different inner diameters and a step wall adjacent to the two annular walls, the locking member and the sealing ring are located on an annular wall with a greater inner diameter, and the locking member pushes an annular body of the sealing ring to tightly abut the step wall.

16. The electro mechanical or electrical connector for use in the electric vehicle according to claim 15, wherein the sealing ring further has a plurality of annular protrusions on inner and outer surfaces, and the sealing ring is forced by the locking member to deform, so that the plurality of annular protrusions on the outer surface tightly abut the annular wall, and the plurality of annular protrusions on the inner surface tightly abut the cable.

17. The electro mechanical or electrical connector for use in the electric vehicle according to claim 16, wherein the plurality of annular protrusions on the outer surface are intervally distributed in the extending axial direction of the cable, and the plurality of annular protrusions on the inner surface are intervally distributed in the extending axial direction of the cable.

18. The electro mechanical or electrical connector for use in the electric vehicle according to claim 12, wherein the locking member comprises: p1 a bottom ring; and
   a side ring extending from the bottom ring and tightly abutting the sealing ring, wherein an elastic arm of the elastic locking hook extends from the bottom ring to the side ring, and is suspended on the side ring, and a locking hook portion of the elastic locking hook is located at a free end of the elastic arm.

19. The electro mechanical or electrical connector for use in the electric vehicle according to claim 18, wherein the bottom ring has a pair of necking recesses adjacent to two opposite sides of the elastic arm.

20. The electro mechanical or electrical connector for use in the electric vehicle according to claim 18, wherein the plug body further has at least one releasing recess on the inner wall, a gap exists between the elastic arm and the releasing recess, the gap is tapered toward the locking recess, and a fixture is adapted for extending into the gap to press and deform the elastic arm, so that the locking hook portion is disengaged from the locking recess.

21. The electro mechanical or electrical connector for use in the electric vehicle according to claim 12, wherein the locking member has a plurality of elastic locking hooks symmetrical relative to an extending axial direction of the cable.

22. The electro mechanical or electrical connector for use in the electric vehicle according to claim 11, wherein the back cover has an asymmetric nut structure relative to an extending axial direction of the cable.

* * * * *